United States Patent [19]

Barbier et al.

[11] 4,374,157

[45] Feb. 15, 1983

[54] PROCESS FOR GASEOUSLY OPALIZING BULBS

[75] Inventors: Jean-Paul Barbier, Fontenay-le-Fleury; Gilbert Lerouyer, Orgerus, both of France

[73] Assignee: L'Air Liquide, Paris, France

[21] Appl. No.: 297,366

[22] Filed: Aug. 28, 1981

[30] Foreign Application Priority Data

Sep. 10, 1980 [FR] France .............................. 80 19503

[51] Int. Cl.³ ........................ B05D 3/04; B05D 7/22; C03C 17/345
[52] U.S. Cl. ..................................... 427/37; 427/106; 427/107; 427/164; 427/167; 427/237
[58] Field of Search ................. 427/37, 106, 107, 164, 427/167, 237

[56] References Cited

U.S. PATENT DOCUMENTS

| | | |
|---|---|---|
| 2,545,896 | 3/1951 | Pipkin . |
| 3,109,747 | 11/1963 | Foote . |
| 3,352,703 | 11/1967 | Domicone et al. . |
| 3,842,306 | 10/1974 | Henderson et al. . |
| 3,868,266 | 2/1975 | Henderson et al. . |

FOREIGN PATENT DOCUMENTS

961085  5/1950  France .

Primary Examiner—James R. Hoffman
Attorney, Agent, or Firm—Browdy & Neimark

[57] ABSTRACT

Glass bulbs are given a deposit of silica by oxidation of silane with oxygen on the inside of the bulb. The silica deposit is formed by oxidation, with oxygen through an electric arc, of silane diluted to a slight concentration of 0.1 to 3% by volume in a gas inert in regard to silane. The process applies to opalizing, i.e. providing a light diffusing layer, incandescent and discharge bulbs of different sizes, including tubes, and globes of lighting fixtures.

10 Claims, 1 Drawing Figure

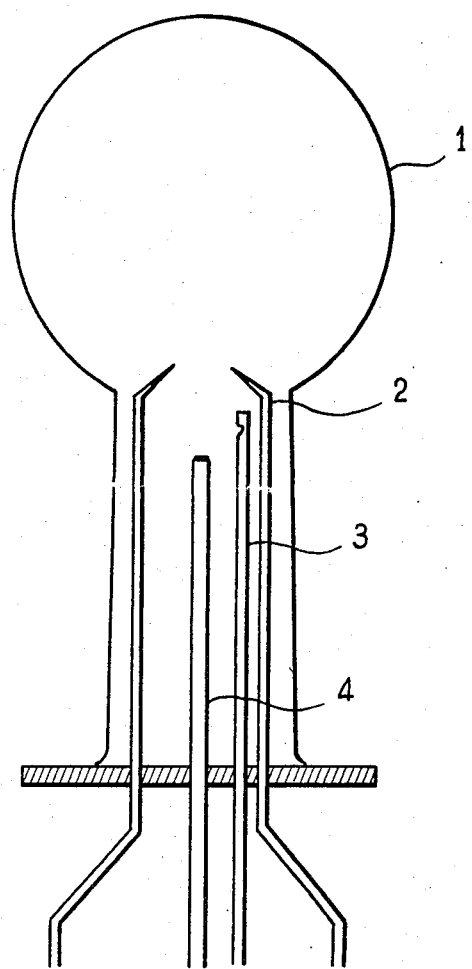

PROCESS FOR GASEOUSLY OPALIZING BULBS

FIELD OF THE INVENTION

This invention relates to a process for gaseously opalizing bulbs, i.e. providing a light diffusing layer on bulbs.

BACKGROUND OF THE INVENTION

Opalizing involves making a deposit of a light-diffusing white product such as titanium dioxide, silica or alumina, the deposit having a sufficient adherence to the bulb and a suitable thickness to effect the desired light diffusion.

Various methods of opalizing light bulbs have been proposed. The industrial process now used consists in filling a bulb with a titanium dioxide suspension which, after evacuation, leaves on the glass surface a white deposit that is dried at a temperature of 400° to 500° C.

Gaseous methods have been proposed but these are few and do not seem to have been industrialized. There can be cited the formation of titanium dioxide deposits by hydrolysis of titanium compounds such as titanium tetrachloride, according to U.S. Pat. No. 3,352,703. Alumina deposits can be obtained by combustion of organic aluminum compounds dissolved in a solvent by applying the teaching of U.S. Pat. Nos. 3,842,306 and 3,868,266. General Electric Co. described providing a silica deposit by combustion of tetraethyl silicate in U.S. Pat. No. 3,109,747 according to a relatively complex multistage process.

French Pat. No. 961,085 relates to making diffusing glasses by application on the inside face of fine particles of amorphous silica, the depositing of which is performed by combustion on the inside of the bulb of an organic silicon compound in the presence of oxygen.

SUMMARY OF THE INVENTION

Believing that silica would be the best performing compound for opalizing bulbs, a method of depositing silica entirely gaseously was sought that on the one hand would be more economical and, on the other hand, would be simpler and faster than known methods. Apparatus for the new opalizing technique can easily be integrated in a bulb production line, thus making manpower savings possible.

According to the present invention, bulbs are opalized gaseously by depositing silica created by oxidation of silane, e.g. $SiH_4$, with oxygen on the inside of a bulb. The silica deposit is formed by oxidation of silane diluted to a concentration of 0.1 to 3% by volume, with oxygen through an electric arc in a gas inert with respect to the silane. Silane diluted in a gas that is inert in regard to the silane is used to avoid prior decomposition of the silicon hydride.

BRIEF DESCRIPTION OF THE FIGURE

The invention will now be more fully described with reference to illustrative embodiments, it being understood that the invention is not to be so limited. One such embodiment is illustrated in the sole FIGURE, which schematically shows an apparatus for effecting the invention.

DETAILED DESCRIPTION OF EMBODIMENTS

As noted above, the invention involves the oxidation, within a bulb intended to be opalized, of $SiH_4$ by $O_2$ in the presence of an electric arc, and with the $SiH_4$ diluted by an inactive diluent gas.

Dilution, which preferably occurs at the time of use, is carried out so that the silane concentration is, for safety reasons, less than that for which there is danger of self-ignition of the silicon hydride. Such concentration is generally greater than about 0.1% by volume so that the opalizing operation will be sufficiently rapid. A 1 to 2% silane content in an inert gas is preferable, because such concentration makes it possible to obtain fast opalizing with safety. The upper limit of the silane concentration is practically from 2.5 to 3% just below the flammability level of the silane. The $SiH_4$ concentration accordingly can be selected to be between 0.1 and 3% by volume.

All gases that are inert in regard to the silane are suitable as an inert carrier; nitrogen, rare gases in the air, helium and hydrogen can be chosen. Nitrogen, argon and helium are particularly advantageous to obtain yields of silica deposit increasing in the order above of these three gases.

Under reaction conditions, the presence of nitrogen leads to the formation of nitrogen oxide vapors, at times rather abundant, but they disappear naturally or can be desorbed by gas scavenging.

Helium is a better dilution gas than nitrogen or argon; it promotes an easier silica deposit and leads to a higher yield.

The opalization yield corresponding to the silicon deposit is determined by weighing the bulb after the operation. The mass of silica deposited on the inside of the bulb is designated by the designation $MSiO_2$ and the total volume of pure silane used for opalization by the designation $VSiH_4$. The silane yield is given by the ratio of the volume of silane theoretically necessary for making the mass of silane deposited, to the total volume of silane used.

The electric arc has the function of permitting oxidation and consequently permitting the deposit of silica by providing for the decomposition of silicon hydride. It was noted that the formation of the silica deposit on the inside of the bulb depends on the voltage applied across the terminals of the AC arc electrodes. The high voltage should be greater than several thousand volts; the high voltage applied is desirably between 5,000 and 10,000 volts, and the best yields are obtained with an electric arc to which a voltage between 7,000 and 9,000 volts is applied, the current strength being low. Below 5,000 volts and above 10,000 volts very little silica is deposited and a drop of opalization yield occurs.

It was noted that use of an electric arc is necessary for formation of the silica deposit. The electric arc should be as wide as possible to pass large amounts of gas in a given period and obtain a fast opalization; spacing of the electrodes is therefore as great as possible as a function of the size of the bulb.

On the other hand, the speed of formation of the silica deposit is a function of the rate of delivery of the gas mixture of silane diluted in an inert gas and oxygen through the electric arc. Under the conditions of the invention, and for current type bulbs, the total delivery of the gases should not be greater than 600 l/h, as beyond this delivery rate the silica deposit is no longer satisfactory.

To obtain a regular deposit of silica on the walls of the bulb, a homogeneous mixture of the two gases—diluted silane and oxygen—is made on the inside of the bulb before passage of the gaseous mixture through the electric arc. To make an *in situ* mixture of the two gases, it is preferable to provide for the delivery of the two gaseous streams at the same or fairly close levels within the bulb. It is advantageous to use a central feeding of dilute silicon hydride to obtain a good distribution of the active gas in the arc and a lateral feeding of oxygen; the silane-inert gas mixture should be delivered at a much higher rate than that of the oxygen.

It is also possible to perform premixing—diluted silane with oxygen—outside the bulb and feed the mixture to the inside of the bulb centered between the electrodes.

The advantage of feeding dilute silane at a high speed to minimize the opalization time is understandable. The dilute silane delivery rate can be advantageously between 100 and 500 liters/hour; below 100 l/h the bulb opalization time is too long and above 500 l/h a drop in opalization yield is noted. Preferably, a dilute silane feed output between 150 and 200 liters/hour is selected; this delivery of active product makes it possible to achieve the goal, namely, the highest possible opalization yield in the shortest possible opalization time. Opalization times are generally between 30 seconds and 4 minutes, an average of 35 seconds to 2 minutes, particularly for bulbs of standard spherical size. The oxygen delivery can advantageously be between 10 and 60 liters/hour and preferably between 10 and 30 liters/hour.

With reference to the figure, *in situ* mixing technique is used, the two gases are fed into the bulb 1 through a central tube 4 intended for passage of the dilute silane in an inert gas, and by a lateral tube 3 for delivery of the oxygen. The delivery height of the gases into the bulb is selected to obtain a regular opalization with the best yield. By placing the delivery orifices in the case of the neck of the bulb of the standard type, a drop in opalization yield is noted in the entire bulb. The same phenomenon of yield reduction is noted when the deliveries of the gas currents are located in the top of the neck, but with this arrangement a very good opalization of the spherical dome is noted. It has been found that positioning the delivery orifices of the gases at a level about two-thirds up the neck of the bulb from the base with interaction of the arc electrodes 2 at the summit of the neck is the optimal condition to obtain an excellent opalization in regard to quality and yield. For safety reasons, it is advantageous to turn the electrodes 2 on before introduction of the gas mixture.

The diameter of the delivery orifices of the tubes 3 and 4 for the gases in the bulb is also selected to meet the two requirements above. In the case of current type bulbs, the spacing between the electrodes is between 10 and 12 millimeters. For other types of bulbs with different neck widths this spacing can be modified and adapted. With standard spherical type bulbs in which the delivery of the $SiH_4$ and inert gas is from 100 to 500 l/hour and the output orifices for the dilute silane and oxygen are positioned two-thirds of the way up the neck from the base of the bulb neck, the most satisfactory results are obtained with circular gas output orifices of a diameter of about 2 millimeters. Under the same conditions with orifices having a diameter three or four times greater, a slight, irregular opalization is noted; thus, with a delivery of dilute silane of 300 to 400 l/hour, the deposit of silica shows two relatively transparent areas a few square millimeters of surface. By selecting rectangular gas delivery orifices, such as slots for example 6 millimeters long and 1 millimeter wide, a reduction of the opalization yield and an irregularity of the deposit are noted.

The favorable influence of an outside cooling of the bulb during opalization was noted; thus, external cooling of the globe by a gas current such as cold nitrogen or forced cold air, cold water, etc., leads to an increase of the yield of silica deposited, on the order of 10% with an equal amount of silane introduced. However, the influence of cooling is less notable on short-lived opalizations of 30 to 60 seconds, during which the globe temperature does not exceed 65° C. instead of 100°–110° C. for an opalization of 2 minutes.

It has also been discovered that a dynamic performance of opalization under partial vacuum can exhibit industrial advantages in apparatus technology. Opalization inside a bulb under slightly reduced pressure maintained during opalization gives greater security, accompanied by a reduction in the risk of pollution and a reduction in silane consumption.

The process is applicable to opalization of incandescent and discharge bulbs of different sizes, including tubes, and also to globes of light fixtures. The process of opalizing ligh bulbs is desirably integrated into a bulb production line.

Opalization of tubes can be performed by applying a translation of the tube parallel to the axis formed by the electrodes and axis of the tube, the length of the electrodes and of the tube for introduction of the gas being at least equal to that of the tube to be opalized.

Examples are given below that illustrate the invention in a nonlimiting manner.

EXAMPLE 1

In a standard size bulb, with a total height of 127 millimeters, whose diameter is 60 millimeters in the spherical part, 36 millimeters from the base of the neck and 33 millimeters up from the top of the neck, with the equipment described above, in which the gas introduction nozzles have a diameter of 2 mm, the gas output orifices are at ⅔ up the neck of the bulb and the electrodes of the arc, spaced 10 mm apart are positioned at the top of the bulb neck, the applied voltage being 8,000 volts and the AC current strength 25 milliamperes, a run was made with a gas delivery of 400 l/h by causing 13.3 liters of silane diluted to 1% in helium to pass for 2 minutes through the central pipe and 0.7 liters of oxygen to pass through the lateral pipe. A very homogeneous deposit of 155 mg of silica with 46.6% yield was obtained.

EXAMPLE 2

Under the same conditions of positioning the arc electrodes as in Example 1, to which a voltage of 8,000 volts was applied, the strength of the AC current being 25 mA, the diameter of the gas delivery nozzles 2 mm as above, a run was made with a gas delivery of 300 l/hour, by causing 12.5 liters of silane diluted to 1% in helium to pass for 2.5 minutes through the central pipe and 0.8 l oxygen to pass through the lateral pipe. A very homogeneous deposit of 140 mg of silica with a 47% yield was obtained.

EXAMPLE 3

Under the same conditions of equipment, positioning of electrodes, voltage, current strength, and diameter of the gas delivery nozzles, a run was made with a gas delivery of 300 l/h by causing 12.5 liters of silane diluted in 1% argon and 0.8 liters of oxygen to pass for 2.5 minutes, a homogeneous deposit of 90 mg of silica with a 29% yield was obtained

EXAMPLE 4

Under identical conditions of equipment, positioning of electrodes, voltage, current strength, and nozzle diameter, a run was made with a gas delivery of 500 l/h by causing 12.5 liters of silane diluted in 1% helium and 0.8 liters of oxygen to pass for 1.5 minutes; a homogeneous deposit of 125 mg corresponding to a good opalization with a 40% yield was obtained.

EXAMPLE 5

Under the conditions as above of equipment, positioning of electrodes, voltage, current strength, and nozzle diameter, a run was made with 300 l/hour gas delivery, by causing 12.5 l of silane diluted in 1% nitrogen and 0.8 liters of oxygen to pass for 2.5 minutes. Nitrogen oxide vapors formed which can possibly be eliminated by gas scavenging or which disappear naturally. A homogeneous deposit of 76 mg of silica with a 24.3% yield was obtained.

EXAMPLE 6

Under the same conditions of equipment with identical positioning of electrodes, applied voltage, and current strength, the diameter of the gas delivery nozzles being 6 millimeters, a run was made with a gas delivery of 300 liters/h, by causing 12.5 liters of silane diluted in 1% argon to pass for 2.5 minutes through the central pipe and 0.8 l of oxygen (20 l/h) through the lateral pipe. A deposit of 110 mg of silica with an irregular opalization of the bulb, the yield being 37%, was obtained.

EXAMPLE 7

Under the same conditions of equipment as above but with replacement of the circular output orifice of the nozzles with a slot 1 mm wide and 6 mm long, 12.5 liters of silane were made to pass through the central pipe and 0.8 liters through the lateral pipe as in Example 6 for 2.5 minutes with a delivery of 300 liters/hour. An irregular deposit of 76 mg of silica with a 25% yield was obtained.

EXAMPLE 8

A series of runs were run with an opalizing machine head with premixing of silane diluted in argon and oxygen according to the conditions of the invention, said opalizing head fitting on a bulb making machine. These runs were made as above on clear standard size bulbs with a diameter of 60 millimeters in the spherical part. First, the influence of the silane content in the mixture of 1 to 1.78% in argon was studied. The results are given in Table 1 below:

TABLE I

| | | | Opalization at ambient $\theta$ | | |
|---|---|---|---|---|---|
| | Q l/h | t' | Volume ml $SiH_4$ | M (mg) $SiO_2$ | R % |
| Mixture 1% | 150 | 2' | 50 | 63 | 49 |
| | 150 | 1'30 | 37 | 47 | 51 |
| Mixture 1.5% | 150 | 1' | 37 | 46 | 50 |
| | | 1'15 | 46 | 60 | 52 |
| | | 1'45 | 65 | 85 | 52 |
| | 170 | 45" | 32 | 44 | 57 |
| | | 1' | 42 | 60 | 58 |
| | | 1'15 | 53 | 77 | 58 |
| | 190 | 45" | 35 | 48 | 55 |
| | | 1' | 47 | 68 | 58 |

TABLE I-continued

| | | | Opalization at ambient $\theta$ | | |
|---|---|---|---|---|---|
| | Q l/h | t' | Volume ml $SiH_4$ | M (mg) $SiO_2$ | R % |
| Mixture 1.78% | 170 | 45" | 37 | 56 | 60 |
| | 190 | 35" | 32 | 54 | 67 |

Q l/h: delivery of silane diluted in argon
t: opalization time
$VSiH_4$: total volume of pure silane used for opalization
$MSiO_2$: mass of silica deposited on the inside of the bulb
R %: silane yield
$\frac{\text{(volume of silane theoretically necessary to make the mass of silica deposited)}}{\text{total volume of silane used}}$ The optimal operation operating conditions for a satisfactory opalization can be deduced from reading this table:

I with silane diluted to 1% in argon
  delivery of gaseous mixture      150 l/h
  delivery of oxygen      10 l/h
  opalization time      1'30"
  mass of silica deposited      47 mg
  yield of $SiO_2$ deposited      51%
II with silane diluted to 1.5% in argon
  delivery of gaseous mixture      170 l/h
  delivery of oxygen      10 l/h
  opalization time      45"
  mass of silica deposited      44 mg
  yield of $SiO_2$ deposited      57%
III with silane diluted to 1.78% in argon
  delivery of gaseous mixture      190 l/h
  delivery of oxygen      15 l/h
  opalization time      35"
  mass of silica deposited      54 mg
  yield of $SiO_2$ deposited      67%

EXAMPLE 9

Study of the influence of external cooling of the bulb during opalization.

The results obtained under the same conditions as the preceding example, but with cooling, are given in Table II below:

| | | | Opalization under cooling | | | |
|---|---|---|---|---|---|---|
| | Q l/h | t' | Volume cm3 $SiH_4$ | M (mg) $SiO_2$ | R % | |
| Mixture 1% | 150 | 2' | 50 | 78 | 62 | cold water |
| | 150 | 1'30 | 37 | 50 | 54 | forced air |
| | 150 | 1'15 | 31 | 41 | 53 | forced air |
| Mixture 1.5% | 170 | 45" | 32 | 48 | 60 | forced air |
| | 190 | 35" | 27 | 40 | 59 | forced air |
| | | 1 | 47 | 73 | 62 | air |
| Mixture 1.78% | 190 | 35" | 32 | 56 | 69 | forced air |

External cooling of the globe leads to an increase in the yield of $SiO_2$ deposited which can amount to more than 10% with an equal amount of silane introduced. But the influence of cooling is less notable on short-lived opalization on the order of 30 to 45 seconds.

EXAMPLE 10

Low pressure test.

In these tests a system of filters to retain the entrained silica particles was used to avoid clogging the vacuum lines and pumping system, the other conditions were similar to those of Example 8. The initial pressure on the inside of the bulb was 0.5 bar absolute, and during the test the pressure was kept between 0.5 and 0.6 bar absolute. The deliveries of fluids were displayed at atmospheric pressure and did not vary or varied only slightly as a function of ΔP during opalization:

| | |
|---|---|
| delivery of $SiH_4$ - Air mixture at 1.5% $SiH_4$ | 175 l/h |
| oxygen delivery | 10 l/h |
| opalization time | 45" |
| mass of $SiO_2$ deposited | 45 to 50 mg |
| yield of $SiO_2$ deposited | 57 to 62% |

It was found that the results obtained under low pressure were completely comparable to those achieved at atmospheric pressure under the same delivery and time conditions.

It will be obvious to those skilled in the art that various changes may be made without departing from the scope of the invention and the invention is not to be considered limited to what is shown in the drawings and described in the specification.

What is claimed is:

1. A process of gaseously opalizing a bulb comprising forming and depositing silica on the inside of the bulb by oxidation of silane with oxygen by means of an electric arc, said silane being diluted to a concentration of 0.1 to 3% by volume in a gas inert in regard to the silane.

2. The process of gaseously opalizing a bulb according to claim 1, wherein the concentration of silane in the inert gas is between 1 and 2%.

3. The process of gaseously opalizing a bulb according to claim 1, wherein the electric arc is fed an AC voltage between 5,000 and 10,000 volts.

4. The process of gaseously opalizing a bulb according to claim 1, wherein the flow rate of dilute silane is between 100 and 500 liters/hour and the oxygen delivery is between 10 and 60 liters/hour.

5. The process of gaseously opalizing a bulb according to claim 1, wherein the opalization is effected with external cooling of the bulb during opalization.

6. The process of gaseously opalizing a bulb according to claim 1, wherein the opalization is performed with the interior of the bulb being maintained under slightly reduced pressure during opalization.

7. The process of opalizing a bulb according to any one of claims 1, 3, 4 or 6, wherein a homogeneous mixture of the two gaseous fluids—dilute silane and oxygen—is made on the inside of the bulb before passage of said gaseous mixture through the electric arc.

8. The process of opalizing a bulb according to any one of claims 1, 3, 4, or 6, wherein there is performed a central feeding of the dilute silane and a lateral feeding of oxygen with the silane delivery rate being much higher than that of the oxygen.

9. The process of opalizing a bulb according to any one of claims 1, 3, 4 or 6, wherein the two gaseous fluids—dilute silane and oxygen—are homogeneously premixed outside of the bulb with the mixture being introduced through a central supply to the interior of the bulb.

10. The process of gaseously opalizing a bulb according to claim 1, wherein the flow rate of dilute silane is between 150 and 200 liters/hour and the oxygen delivery is between 10 and 30 liters/hour.

* * * * *